INVENTOR.
LONNIE A. BURNETT
BY Howard J. Weiser
& Jack J. Earl
ATTORNEYS

March 16, 1965

L. A. BURNETT 3,174,081

LOGIC NOR RELAY CIRCUITS

Filed Nov. 21, 1962

2 Sheets-Sheet 2

United States Patent Office 3,174,081
Patented Mar. 16, 1965

3,174,081

LOGIC NOR RELAY CIRCUITS

Lonnie A. Burnett, Cincinnati, Ohio, assignor to The Cincinnati Milling Machine Co., Cincinnati, Ohio, a corporation of Ohio Filed Nov. 21, 1962, Ser. No. 239,161
4 Claims. (Cl. 317—155.5)

The present invention relates to electrical circuits and more particularly to combinations of logic nor circuits utilizing reed switches to perform a logic function.

The logic nor function, that is sensing of a "not or" condition to produce an output indicative of the condition, can be explained in terms of binary conditions, for example "true" and "false" conditions. A circuit which produces a "true" output only when neither one nor the other of a pair of inputs is "true" performs a logic nor function. That is to say, all inputs must be "false" to produce a "true" output and a "false" output is produced when any one or all of the inputs are "true." Many semi-conductor switching circuits are available to perform the logic nor function but these contain a considerable number of components and do not give an inherent power amplification in their performance without an amplifying stage. These semi-conductor devices are very fast in operation however which makes them the only practical form in some operations. There are operations however which do not require the extreme speed of semi-conductive devices but which still require operate speeds in excess of those available in relay logic circuits which have been known heretofore. These known relay logic circuits also are disadvantageous in that multiple relay contacts are required for each logic function. Since reliability of these circuits has proven to be limited in most instances of failure by the life of the contacts, the reduction of the number of contacts needed to perform a logic function is important to establish a useable reliability for relay logic circuits.

As an object of this invention, it is intended that circuit combinations utilizing a basic logic nor relay circuit be provided to perform electrical operations usually performed by electronic devices.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its basic embodiment, the present invention employs cross connected logic circuits each of which utilizes a single reed switch having two energizing coils disposed therearound which are of equal flux rating but of opposing polarity when energized. The single pair of contacts are connected in an output circuit to provide alternate conditions of the output circuit depending on the open or closed state of the contacts. One of the coils is connected to a constant potential at one end only and the other end is open circuited to be normally deenergized. The other coil is connected across an electrical power source for continuous energization. Thus in the normal circuit state, a net flux of one unit is produced to act on the contacts to move them to their energized state and to hold them there, a flux unit being that amount of flux produced by one of the coils when energized under normal operating conditions. The other end of the normally deenergized coil is connectable to a potential source to energize that coil and produce an opposing flux unit to cancel the constant flux unit to allow the contacts to shift to their normal or deenergized state.

A clear understanding of this invention can be obtained from the following detailed description in which reference is made to the attached drawings wherein.

Figure 1:
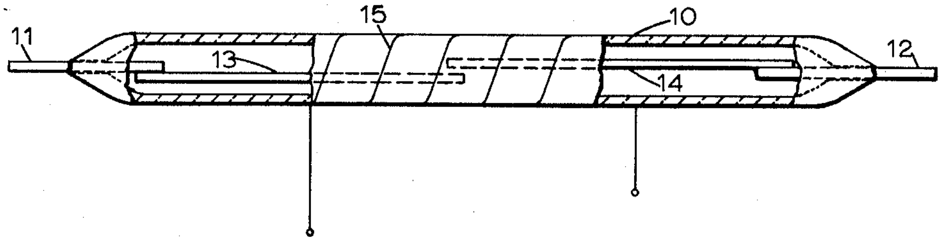
FIG. 1 is a drawing of a reed type switching module.

A reed switch or relay is shown in FIG. 1. The relay is comprised of a sealed enclosure 10, made of glass, which is filled with an inert gas. A pair of terminals 11, 12 extend through the enclosure 10 at each end to provide means to connect the device in circuit. Inside the enclosure 10 and extending toward each other in overlapping fashion are a pair of reed switch contacts 13, 14 which are fixed to the terminals 11, 12 respectively. The reed contacts 13, 14 are made of resilient magnetic material and, in the device shown, are normally separated to be in a normally open state. An electrical coil 15 is disposed around the enclosure 10 and when a current is passed therethrough, a magnetic field is created which will cause the contacts 13, 14 to move together to close and complete an electrical path between the terminals 11, 12. The device shown is commonly termed a dry reed switch and its contacts 13, 14 are usually plated with a noble metal such as gold to improve the circuit completing characteristics of the device. While the single coil 15 is shown, more than one coil may be disposed around the enclosure 15 as for example a second coil of opposing polarity as will be used in the "nor" circuit of this invention. Relays of the dry reed described are shown and described in detail in U.S. Patent 2,289,830 issued on July 14, 1942, on an application filed by Walter B. Ellwood.

Figure 2:
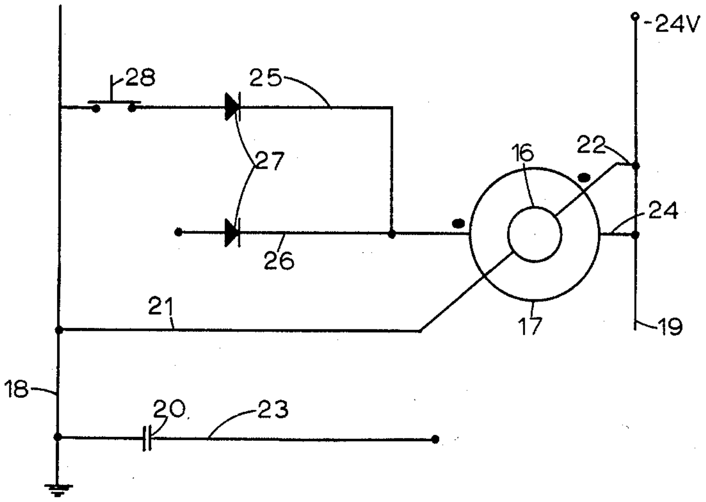
FIG. 2 is a schematic drawing of an electrical logic nor circuit.

The nor circuit used in this invention is shown schematically in FIG. 2. The circuit includes a reed switch having two coils 16, 17 which produce equal amounts of magnetic flux when connected across the power lines 18, 19. The polarity of the coils 16, 17 as indicated is opposing and when both are connected across the potential of lines 18, 19 a net flux of zero is created. With no net flux, a pair of contacts 20 which are operated by the coils 16, 17 are in their normally open condition. When either of the coils 16, 17 is energized alone a net flux of one unit is created and the contacts 20 close and remain so until the net flux is reduced. As shown, the lines 18, 19 are ground and −24 volts potential, respectively, but this is for illustration only and any plus to minus relationship that will produce the one flux unit from each coil 16, 17 is sufficient. A circuit including conductors 21, 22 is connected to maintain the coil 16 energized to produce its one flux unit at all times. Thus the contacts 20 are closed to connect an output lead 23 to the power line 18. The other coil 17 is connected at one side to the power line 19 by a lead 24. The other side of the coil 17 is connected to the parallel input leads 25, 26, each of which includes a one way current directing diode 27. When one or both of the leads 25, 26 are connected to the potential of the power line 18, the coil 17 is energized to produce a flux unit opposing that of the coil 16 and the contacts 20 shift to their normally open state to disconnect the output lead 23 from the power line 18. A switch 28 is shown between the lead 25 and the power line 18 to illustrate one way in which the potential of that line can be connected to the coil 17 but this is for illustration only and other suitable input circuits, for example a ground potential pulse generator may readily be substituted therefor.

In operation of the logic nor circuit described it can be stated that the connection of a ground potential to either or both of the leads 25, 26 represents an input "true" condition. Since the net flux produced by the coils 16, 17 is then nil, the contacts 20 are opened and the output lead 23 is disconnected from ground potential representing an output "false" condition. On the other hand, when neither of the leads 25, 26 is connected to the potential of power line 18, an input "false" condition exists and the lead 23 is connected to line 18 to produce an output "true" condition. Thus it is shown that the circuit of FIG. 2 performs the logic nor function. A dry reed circuit of this construction has been tested to determine its performance under operating condition. The reed switches used in the circuit were dry reed contacts 20 with sintered gold coating rated at 15 volt ampere capacity and the coils 16, 17 were rated at 1200 ohms direct current resistance. The diodes 27 were switching diodes commercially available under the designation 1N645. The nor circuit was found to have a nominal pick-up and release time, that is contact closing and opening, of 2 milliseconds with the 24 volts direct current energizing the coils 16, 17. The device had an input loading of 20 milliamperes and an output drive capability of 500 milliamperes. This combined with the operate cycle reliability of dry reed switches which runs consistently into the range of several 100's of millions of times indicates that the nor circuit described is a very effective medium speed logic circuit with inherent amplification and high reliability.

Figure 3:
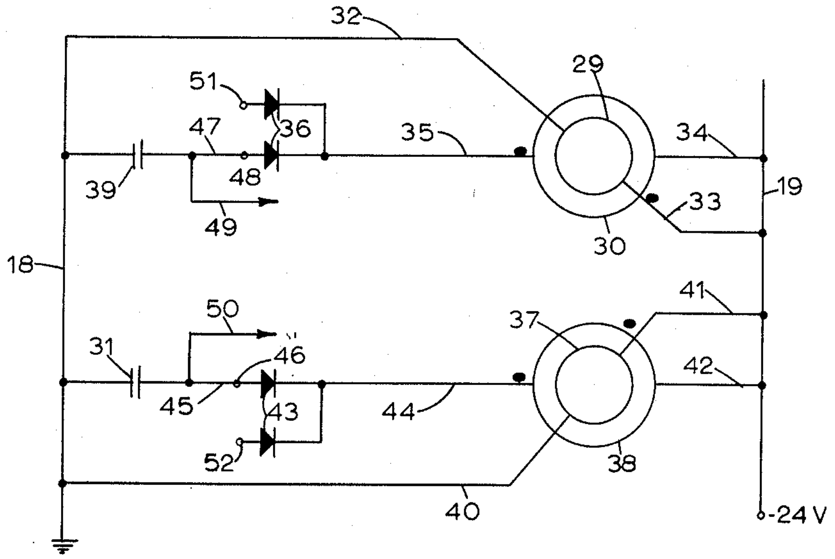
FIG. 3 is a schematic drawing of a set-reset flip-flop circuit utilizing the circuit of FIG. 2.

A set-reset bistable or flip-flop circuit using a pair of the cross connected logic nor circuits described is shown in FIG. 3. A reed relay having the bias coil 29 and opposing coil 30 to produce the opening and closing of the contacts 31 are included in one nor circuit. The bias coil 29 is maintained energized by the leads 32, 33 which are connected across the power lines 18, 19 to produce its one flux unit tending to hold the contacts 31 closed. One side of the opposing coil 30 is connected to the power line 19 by a conductor 34 while the other side is connected by the lead 35 to a pair of input diodes 36 in parallel. The other nor circuit is comprised of the bias coil 37 and the opposing coil 38 which operate the reed contact set 39. The bias coil 37 is connected across the power lines 18, 19 for constant energization by a pair of leads 40, 41. The opposing coil 38 is connected at one side to the line 19 by a lead 42 while the other side is connected to parallel input diodes 43 by a conductor 44. The contacts 31 of the first described nor circuit are in its output lead 45 which connects to one of the input diodes 43 of the second described nor circuit at the terminal 46. Likewise the contacts 39 are connected in the output lead 47 of the second described circuit which connects to the input diode 36 of the first logic circuit at terminal 48. Thus the outputs of each of the nor circuits are cross connected as inputs to each of the other circuits. An output lead 49 is connected to the conductor 47 and can be considered as a set output lead which is connected to ground whenever the contacts 39 are closed. Likewise a lead 50 is connected to the conductor 45 and is a ground potential whenever the contacts 31 are closed to furnish a reset output. A terminal 51 connected to one of the diodes 36 can be considered as the set input terminal while a terminal 52 connected to one of the diodes 43 can be considered as the reset terminal.

Ground potential pulses connected to the terminals 51, 52 will produce the flip-flop action of the circuits. Consider a set pulse at terminal 51 first. The net flux in coils 29, 30 then is zero and the contacts 31 are opened. When the contacts 31 open and no reset pulse is connected to the terminal 52, the net flux between the coils 37, 38 is one unit and the contacts 39 are closed. Thus a ground output is produced at the set output lead 49. The circuit remains in this condition until a pulse is applied at the reset terminal 52 to produce a net flux of zero between coils 37, 38 to open the contacts 39. With the contacts 39 open, the net flux between the coils 29, 30 is one unit and the contacts 31 are closed. Thus the circuit is flipped to produce a ground potential output on the lead 50. The circuit now remains in this condition until the next ground pulse appears at the set input terminal 51 at which time the circuit flops back to its set condition. Thus a set-reset flip-flop circuit for use as binary memory is produced by the described cross connection of the two nor circuits. In a circuit as described, an input pulse width of 6 milliseconds was found satisfactory for operation with an input loading of 20 milliamperes while an output drive of 480 milliamperes was found to be available. It can be seen from this that the inherent advantage of the power amplification of the basic nor circuit is found to prevail in the flip-flop circuit described.

Figure 4:
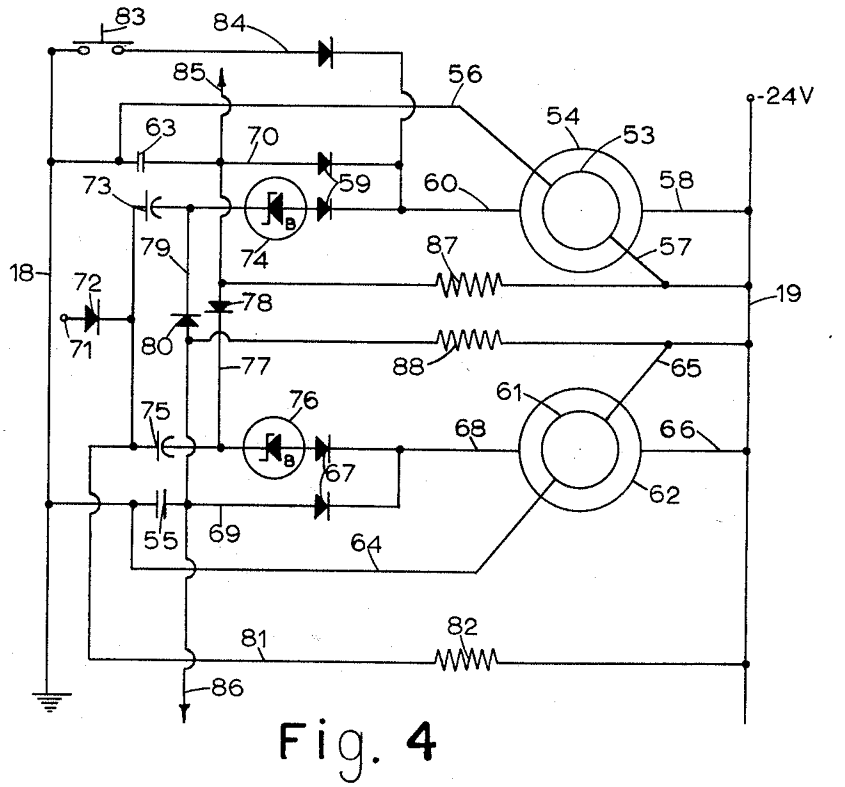
FIG. 4 is a schematic drawing of a toggle type flip-flop circuit utilizing the circuit of FIG. 2.

A toggle type flip-flop circuit, that is a circuit in which input pulses can be applied at a single input terminal to produce a bistable circuit operation, is shown in FIG. 4. Again two cross connected logic nor circuits are used. One logic circuit includes the bias coil 53 and the opposition coil 54 which combine to operate the contacts 55 in the manner described heretofore. The bias winding 53 is connected across the power lines 18, 19 for constant energization by the conductors 56, 57 while only one side of the opposition coil 54 is always connected to one of the power lines, 19, by a lead 58. The other side of the coil 54 is connected to parallel input diodes 59 through a lead 60. The other logic circuit includes the bias coil 61 and opposition coil 62 which combine to operate the contacts 63. The bias coil is similarly constantly energized by the connection of the power lines 18, 19 thereacross by the conductors 64, 65. One side of the opposition winding 62 is tied to the power line 19 by a lead 66 and the other side of that winding is connected to parallel input diodes 67 by a lead 68. The outputs of the two nor circuits as represented by the contacts 55, 63 are cross connected as inputs one of each set of input diodes 67, 59 respectively, these contacts each being in a conductor 69, 70 respectively, connected between the power line 18 and those diodes.

Thus far the circuit described is the same as that described for the set-reset flip-flop circuit. The difference between the presently described toggle acting circuit and the previously described circuit is the manner in which the pulses are connected to the circuit. A single input terminal 71 with a current directing diode 72 is provided for connection of successive pulses at ground potential from a single pulse generator (not shown). A steering or pulse transfer circuit operates to direct the pulses first to one and then to the other of the nor circuit input leads 60, 68 through one of the input diodes 59, 67, respectively. A capacitor 73 and a breakdown or zener diode 74 are connected in series between the lead 60 of one logic circuit and the pulse input terminal 71. Similarly a capacitor 75 and a zener diode 76 are connected between the pulse input terminal 71 and the lead 68 in the other nor logic circuit. The conductor 70 is connected between the capacitor 75 and zener diode 76 by means of a conductor 77 in which a current directing diode 78 is included. The conductor 69 is connected between the capacitor 73 and zener diode 74 by a conductor 79 which also includes a one way current limiting diode 80. A capacitor charging path is furnished through a conductor 81 and a resistor 82 connected between the power line 19 and the pulse input diode 72.

The toggle circuit is operated in the following manner. First assume that the circuit is in a set condition obtained by momentarily closing a switch 83 connected between the power line 18 and the line 60 in a conductor 84. This energizes both of the coils 53, 54 and the net flux produced thereby is zero to open the contacts 55. The coil 62 is deenergized at this time and the flux from the coil 61 closes the contacts 63 to latch the circuit in a set condition by continuing to energize the coil 54 along with the coil 53. An output conductor 85 will then be at ground potential. At this same time, one side of the capacitor 75 will be connected to the power line 18 through the conductor 77 and the contacts 63 while its other side is connected to the power line 19 by the conductor 81. The capacitor 75 is then charged to a full 24 volts potential thereacross very quickly since the resistance 82 is relatively small. The circuit remains in this condition until the first pulse at ground potential is applied to the terminal 71. The negative side of the capacitor 75 is then suddenly shifted from the −24 volts of line 19 to ground potential and since the capacitor 75 has a potential of 24 volts across it, its positive side correspondingly is elevated to a +24 volt level. The zener diode 76 is rated to break down at 12 volts and therefore the zener diode 76 conducts when the positive side of the capacitor 75 rises to the +24 volt level. The capacitor 75 discharges through the zenor diode 76, and the opposition coil 62 to produce a net flux of zero acting on the contacts 63 which open as a result. Now the net flux from the coils 53, 54 acting on the contact 55 is one unit and those contacts close to latch the circuit in the reset condition with the contacts 55 closed to connect an output line 86 to the power line 18. While the circuit is in this condition, the capacitor 73 is charged with a 24 volt potential thereacross since its negative side is connected in circuit with the charging path 81 to the negative power line 19 and its positive side is now connected via the line 79 and the contacts 55 to the positive power line 19. The next pulse at terminal 71 raises the negative side of the capacitor 73 to ground and its positive side to a +24 volt level and the zener diode 74 breaks down to discharge the capacitor 73 through the opposition coil 54 and the circuit is flopped back to its set condition with the contacts 63 closed and the lead 85 connected in the output to the power line 18. The resistances 87, 88 which are connected in circuit between the power line 19 and the lines 77, 79, respectively, in the pulse transfer circuit are bleeder resistances to preserve capacitor charge during long intervals between pulses at the terminal 71. The bleeder resistors 87, 88 are large relative to the charging resistance 82. A toggle circuit like the one described has been constructed in which the capacitors 73, 75 are rated for use with a maximum of 50 volts direct current potential and have a capacitance of 5 microfarads, the charging resistor 82 is 250 ohms, the zener diodes are 12 volt breakdown, and the bleeder resistances are 2200 ohms. The circuit was found to perform satisfactorily with input pulses of 8 millisecond width and had a recovery time of 8 milliseconds to provide a circuit of approximately 60 cycles per second frequency of operation. The input loading was found to be 100 milliamperes but the output drive was found to be 400 milliamperes, a substantial power amplification.

What is claimed is:

1. A set and reset flip-flop circuit comprising in combination:

(*a*) a pair of logic nor relay circuits, each of said logic circuits including:

(1) an output circuit having a set of normally open reed contacts connected therein to interrupt said output circuit, (2) a bias winding associated with said contacts and effective when energized to produce a magnetic flux field to hold said contacts closed to complete said output circuit, (3) means to maintain said bias winding energized, (4) an opposition winding associated with said contacts and operable when energized to produce a magnetic flux field opposing the flux field of said bias winding to allow said contacts to move to the normal condition thereof and interrupt said output circuit, and (5) a pair of parallel input leads connected to said opposition winding, each of said input leads operable to energize said opposition winding when a predetermined electrical potential is impressed thereon, (*b*) means to connect the output circuit of one of said logic circuits to one of the parallel inputs of the other logic circuit and the output circuit of said other logic circuit to one of the parallel inputs of said one logic circuit, each of said output circuits operable to impress said predetermined potential on the input lead connected thereto when the respective relay contacts therein are closed, and (*c*) means to connect pulses of said predetermined potential alternately on the other of said input leads for alternate reversal of the condition of said contacts to produce set and reset signals in accordance with the application of said pulses.

2. A set and reset flip-flop circuit comprising in combination:

(*a*) a pair of logic nor relay circuits, each of said logic circuits including:

(1) an output circuit having a set of normally open reed contacts connected therein and an output lead, said output lead having one potential thereon when said contacts are open and another potential thereon when said contacts are closed, (2) a bias winding proximate to said contacts and effective when energized to produce a magnetic force thereon to close said contacts, (3) an energizing circuit connected across said bias winding to maintain said bias winding energized, (4) an opposition winding proximate to said contacts and effective when energized to produce a magnetic force opposing said bias winding force to allow said contacts to open, (5) a conductor connected to one end of said opposition winding to impress a constant potential thereon, and (6) a pair of input leads connected to the other end of said opposition winding for completion of a circuit to energize said opposition winding when a predetermined potential is impressed on either one thereof, (*b*) a pair of leads cross connecting the output circuit of each of said logic circuits to one of the input leads of the other of said logic circuits, each of said output circuits operable to impress said predetermined potential on the input lead connected thereto when the respective contacts therein are closed, and (*c*) means to connect pulses of said predetermined potential alternately on the other of said input leads for reversal of the condition of said contacts to produce set and reset signals of said one and another potentials on said output leads in accordance with said pulses.

3. A toggle flip-flop circuit comprising in combination:

(*a*) a pair of logic nor relay circuits, each of said logic circuits including:

(1) a pair of normally open reed contacts, (2) a bias winding associated with said switch contacts and effective when energized to produce a magnetic flux field to hold said contacts closed, (3) means to maintain said bias winding energized, (4) an opposition winding associated with said contacts and operable when energized to produce a magnetic flux field opposing the flux field of said bias winding to allow said contacts to move to the normal condition thereof, and (5) a pair of parallel input leads connected to said opposition winding, each of said input leads operable to energize said opposition winding when a predetermined electrical potential is impressed thereon, (b) means to connect the contacts of one of said logic circuits to one of said input leads of the other of said logic circuits and the contacts of said other logic circuit to one of said input leads of said one logic circuit, and (c) a transfer circuit responsive to the condition of each of said contacts to couple successive input pulses alternately to the other input leads of said logic circuits to reverse the condition of said contacts with each input pulse.

4. A toggle flip-flop circuit comprising in combination:

(a) a pair of alternately conditionable logic nor relay circuits, each of said logic circuits including:

(1) a pair of normally open reed contacts, (2) a bias winding associated with said contacts and effective when energized to produce a magnetic flux field to hold said contacts closed, (3) means to maintain said bias winding energized, (4) an opposition winding associated with said contacts and operable when energized to produce a magnetic flux field opposing the flux field of said bias winding to allow said contacts to move to the normal condition thereof, and (5) a pair of parallel input leads connected to said opposition winding, each of said input leads operable to energize said opposition winding when a predetermined electrical potential is impressed thereon, (b) means to connect the contacts of one of said logic circuits to one of said input leads of the other of said logic circuits and the contacts of said other logic circuit to one of said input leads of said one logic circuit, whereby said logic circuits are maintained in opposite conditions, and (c) a pulse transfer circuit connected across the other input leads of said logic circuits and including:

(1) a pair of breakdown diodes, each connected in series with one of said other input leads, (2) a single pulse coupling lead, (3) a pair of capacitors, each connected between said pulse coupling lead and one of said breakdown diodes, (4) a capacitor charging circuit, said charging circuit alternately completed for charging one and the other of said capacitors in response to alternate closing of said contacts, said capacitors operable when in a charged condition to discharge through the respective breakdown diode and input lead in circuit therewith when a pulse of predetermined potential is connected to said pulse coupling lead to effect reversal of the condition of said logic circuits.

References Cited by the Examiner

UNITED STATES PATENTS

| | | | |
|---|---|---|---|
| 3,010,053 | 11/61 | Schubert | 317—155.5 X |
| 3,088,056 | 4/63 | Tevonian | 317—140 X |
| 3,100,972 | 8/63 | Mobarry | 317—157 X |

OTHER REFERENCES

"The Ferreed" (Feiner et al.), Bell System Technical Journal, vol. XXXIX, No. 1, January 1960. (Copy in Scientific Library and in Group 270.)

SAMUEL BERNSTEIN, *Primary Examiner.*